United States Patent

Salovuori et al.

[11] Patent Number: 5,870,384
[45] Date of Patent: Feb. 9, 1999

[54] METHOD AND EQUIPMENT FOR PRIORITIZING TRAFFIC IN AN ATM NETWORK

[75] Inventors: Heikki Salovuori; Mika Kasslin, both of Helsinki, Finland

[73] Assignee: Nokia Telecommunications Oy, Espoo, Finland

[21] Appl. No.: 737,470

[22] PCT Filed: May 23, 1995

[86] PCT No.: PCT/FI95/00282

§ 371 Date: Nov. 21, 1996

§ 102(e) Date: Nov. 21, 1996

[87] PCT Pub. No.: WO95/32570

PCT Pub. Date: Nov. 30, 1995

[30] Foreign Application Priority Data

May 24, 1994 [FI] Finland .................................. 942406

[51] Int. Cl.⁶ .................................................. H04L 12/56
[52] U.S. Cl. .......................................... 370/235; 370/397
[58] Field of Search .................................. 370/229, 230, 370/232, 233, 238, 389, 394, 395, 397, 399, 401, 409, 412, 413, 414

[56] References Cited

U.S. PATENT DOCUMENTS

| 5,313,579 | 5/1994 | Chao .................................... 395/200.15 |
| 5,390,176 | 2/1995 | Schoute et al. .......................... 370/395 |
| 5,394,408 | 2/1995 | Nishihara et al. ....................... 371/57.2 |
| 5,499,238 | 3/1996 | Shon ....................................... 370/399 |
| 5,546,389 | 8/1996 | Wippenbeck et al. .................. 370/412 |
| 5,550,823 | 8/1996 | Irie et al. ................................. 370/413 |
| 5,555,264 | 9/1996 | Sallberg et al. ........................ 370/414 |
| 5,617,416 | 4/1997 | Damien ................................... 370/391 |

OTHER PUBLICATIONS

ITU–T 1.610, Mar. 1993, "B–ISDN Operation and Maintenance Principles and Functions".
ITU–T 1.361, Mar. 1993, "B–ISDN ATM Layer Specification".

*Primary Examiner*—Alpus H. Hsu
*Assistant Examiner*—Kwang B. Yao
*Attorney, Agent, or Firm*—IP Group of Pillsbury Madison & Sutro LLP

[57] ABSTRACT

A method and an equipment for prioritizing traffic in an ATM network, in which services of the network are divided into different service classes, and cells are transmitted via service-class-specific buffers, whereby a cell is temporarily stored in the buffer corresponding to the service class of said cell. In order to be able to pay as much attention as possible to the application of the subscriber at the time in question and at the same time retain the trunk network as simple as possible, the service class division is implemented at least at an NNI interface of the network only by means of a virtual path identifier (VPI) in the header of the cell so that one service class corresponds to each identifier and a certain group of virtual path identifiers belongs to the same service class.

7 Claims, 4 Drawing Sheets

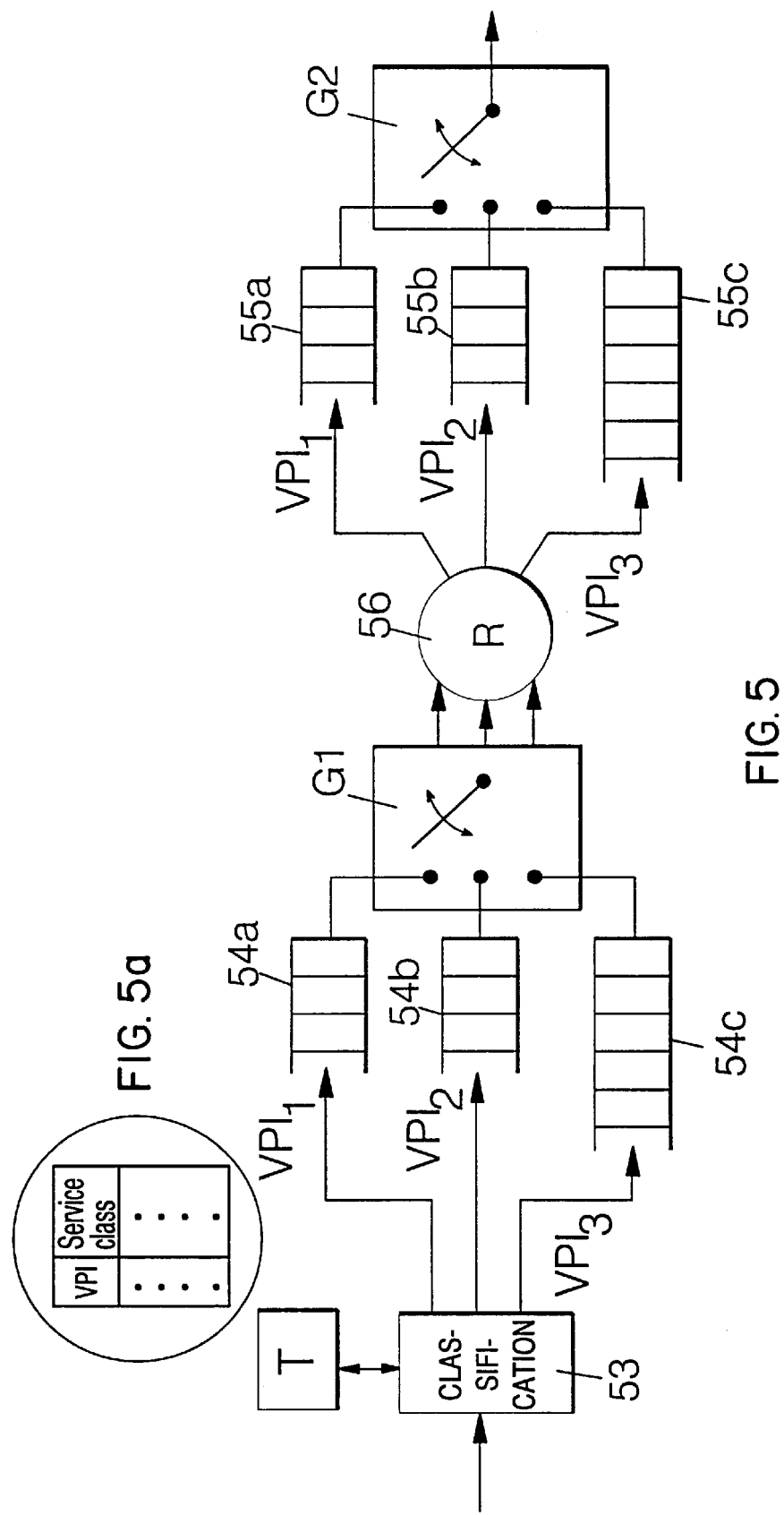

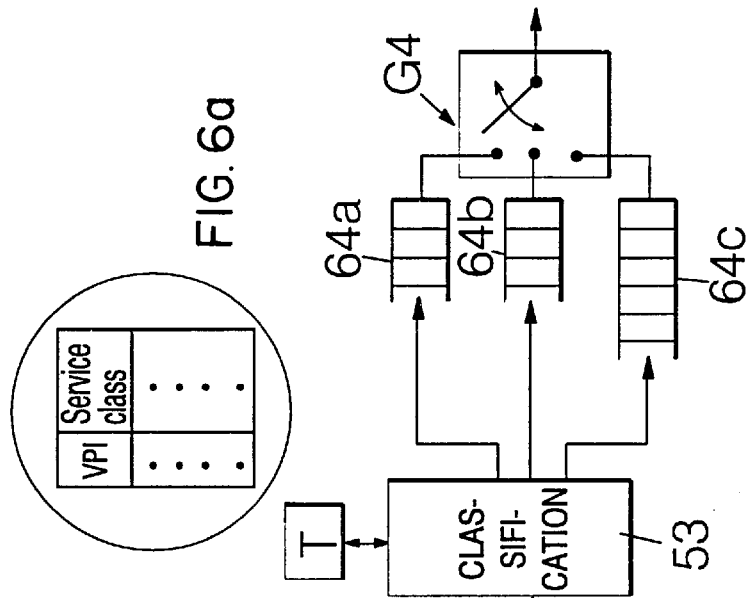
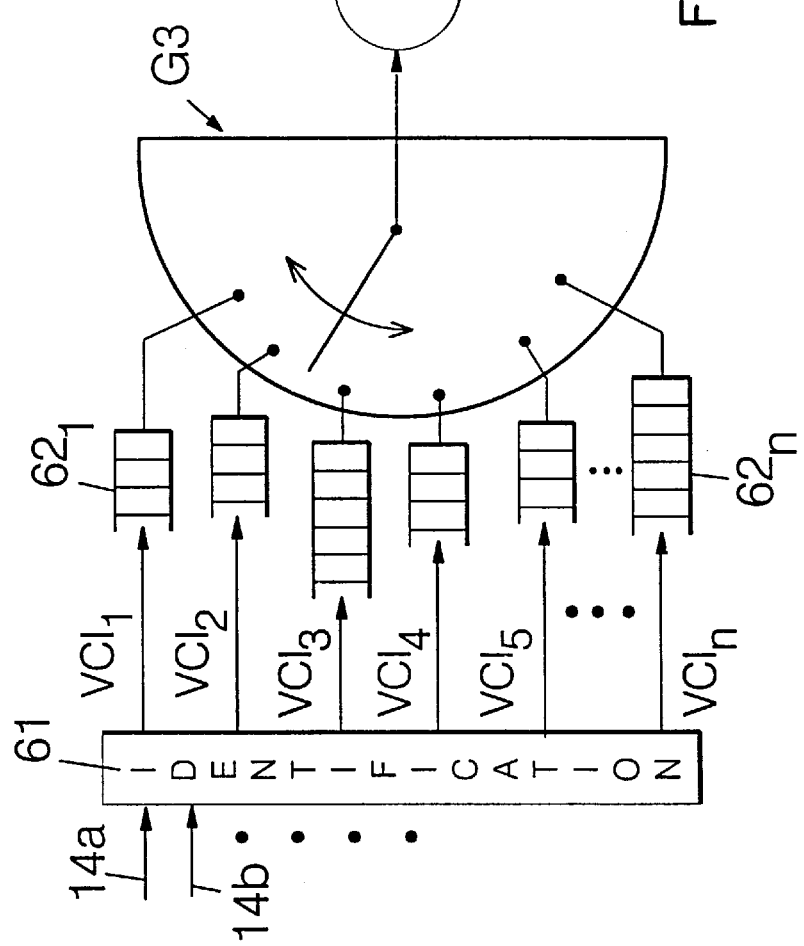
FIG. 6a
FIG. 6

METHOD AND EQUIPMENT FOR PRIORITIZING TRAFFIC IN AN ATM NETWORK

This application is the national phase of international application PCT/FI195/00282 filed May 23, 1995 which designated the U.S.

BACKGROUND OF INVENTION

The invention relates to a method and an equipment for prioritizing traffic in an ATM network.

ATM (Asynchronous Transfer Mode) is a new connection-oriented packet-switching technique which the international telecommunication standardization organization ITU T has chosen to be the target solution of a broadband integrated services digital network (B-ISDN). The problems of conventional packet networks have been eliminated in the ATM network by starting to use short packets of a standard length (53 bytes) known as cells.

FIG. 1a shows the structure of one cell to be transmitted in an ATM network. Each cell transmitted in the network contains a payload part of 48 bytes and a header of 5 bytes in length. However the more exact structure of, the header (the contents of the header) depends on which part of the ATM network is being used at the time. The ATM network architecture comprises a group of interfaces exactly specified in the standards, and the header structure used in an ATM cell depends on the interface (that is, the part of the network) in question.

FIG. 1b shows the structure of the header of a cell at a UNI interface (User-to-Network Interface) of the ATM network that is an interface between an ATM terminal equipment (such as a computer, a router or a telephone exchange) and an ATM node. FIG. 1c shows the structure of the header at an NNI interface (Network-to-Network Interface) of the ATM network that is an interface between two ATM nodes, either inside the network or between two different networks. The most significant part of the header for the present invention is a routing field that comprises a virtual path identifier VPI and a virtual channel identifier VCI.

In the header structure of FIG. 1b, which is used only at a subscriber interface, 24 bits in all are reserved for the routing field (VPI/VCI). In the header structure of FIG. 1c, which is used anywhere else in the ATM network, 28 bits are reserved for the routing field (VPI/VCI). As the name suggests, the routing field is the basis for the routing of cells in the ATM network. The inner parts of the network primarily use the virtual path identifier VPI which, in practice, often defines to which physical connection a cell is to be routed. On the other hand, the virtual channel identifier VCI is used in routing only at the boundary of the network, for example when connecting FR connections (FR=Frame Relay) to the ATM network.

However, it is to be noted that only the VPI and VCI together define the route of the cell unambiguously.

Other fields in the header of the ATM cell defined by the specifications are

GFC (Generic Flow Control), a field intended for traffic control at a subscriber interface, not yet exactly defined, PT (Payload Type), primarily used for distinguishing between the administrative cells of the network and the information cells of the subscribers but part of the field can possibly be used for transmitting virtual-path-specific and virtual-channel-specific congestion notices, CLP (Cell Loss Priority) is used for prioritizing cells in relation to the discard probability (which closely corresponds to the DE bit of the Frame Relay network), HEC (Header Error Control), the check sum of the header.

Of these other fields, the present invention is solely concerned with the CLP bit, by means of which cells can be prioritized in relation to the probability of loss. In practice, this field has two different meanings. Primarily, applications can distinguish cells with a CLP bit with regard to how important their throughput is for the application (Service Oriented Marking). On the other hand, the CLP bit can be set by the network on those cells that exceed the traffic sold to the subscriber. In this case it is a question of usage parameter control (UPC).

The use of the CLP bit closely corresponds to the use of the DE bit in the Frame Relay network. However, the biggest difference is that in the ATM network, applications also make use of the possibility provided by the CLP bit for prioritizing cells. This is an especially common practice for video coders and generally, transmission sources with a variable bit rate (VBR). In coders, the CLP bit is not set on the cells of significance for the whole, whereas on other cells it is set.

Also, the response of the network to the cells, on which the CLP bit is set, corresponds to a great degree to the way the FR network reacts to the frames on which the DE bit is set. In congestion situations of the network, when the fill rates of the buffers increase, primarily only those cells are discarded on which the CLP bit has been set.

The ATM cell will not be described any further in this connection. The cell and its operation have been described in the CCITT standard I.361 (reference [1], in the list of references provided at the end of this specification) which is referred to for a more exact description. A more exact description of the ATM technique can be obtained in references [1] and [2], for example.

In an ATM network operating merely in compliance with the specifications, traffic is not prioritized in any other way but by discarding cells on the basis of the CLP bit. The cells are buffered in nodes in common buffers that operate on the FIFO principle. Thus, the traffic source cannot be taken into account at all, which means that a short delay, for example, cannot be granted to subscribers requiring it. Neither is the use of the CLP bit in prioritizing the discarding of cells very efficient, as only the incoming cells to the buffer can be discarded, without paying any attention to the cells already in the buffer.

In the past few years, different kinds of methods based on service class type of solutions have been developed for prioritizing traffic. The developed solutions have primarily been based on the use of the CLP bit. As was mentioned earlier, this bit is used for two different purposes, which makes its use in prioritizing cells often inappropriate.

In one of the most general methods (a so-called Push-out Scheme), a common buffer is used, in the filling of which the service class the cell belongs to is taken into account. In practice, the operation can be based on two classes only (notified by the CLP bit). One cell of a lower service class is always discarded from a full buffer when a cell of an upper service class is received. A buffer that is not full is filled in the normal FIFO way. By prioritizing the cells significant for the applications, it is ensured that cell throughput probability will be relatively high with a short delay. The problem of the method is that it is difficult to implement, especially in hardware implementations, because of which the processing time of cells in the buffers increases. A further problem is that, in practice, the method does not operate as it does in the case of two classes. The discarding of cells specifically for each class from the buffer will, in practice, be impossible with a greater number of classes. The principle of the method is shown in FIG. 2, in which reference signs $IN_0$ and $IN_1$ indicate the incoming of cells of the lower and of the upper class, respectively, and reference signs $DEL_0$ and $DEL_1$ the corresponding deletions. Reference sign S indicates a buffer length and reference sign G, a server reading in the buffer. The cells of the upper class are discarded in this method only when the buffer is filled with cells of the upper class only.

A method, Partial Buffer Sharing, PBS, which is easier to implement, has been developed from the one described above. This method utilizes a partial sharing of the buffering capacity. This method is illustrated in FIG. 3 in which the same reference numerals are used as in FIG. 2. The bases of sharing are two (to be notified by a CLP bit) service classes, the primary difference between which is their attitude towards delay. The largest part of the buffer (which part is indicated in the figure by reference sign $S_0$) is used as a normal FIFO buffer. The remaining part of the buffer, $S-S_0$, is used only for buffering cells with a higher class priority. This means that no mechanism is needed for discarding cells in the buffer, and implementation becomes simpler than in the push-out method described above. The greatest shortcoming of this method is that bursts on a lower service level may cause the discarding of rather a great number of cells of a higher service level. Many of the same problems as in the conventional FIFO method still remain in this method. Prioritization provided specifically for each class is impossible without complicated buffer-handling methods. Furthermore, even in this case, the implementation of more than two classes is in practice impossible.

In addition to these two prioritizing methods, a method (not illustrated) based on so-called route separation has been disclosed. In this method, cells belonging to different service classes are routed via different routes. In each connection, only traffic of one service class passes inside the network. A drawback of this method is that the service class division applies to the whole network, which causes problems with dimensioning. The prioritization of cells cannot be performed specifically for each node, for example, because cells of another service class pass through a different node.

The disadvantages described above have been successfully eliminated in the newest arrangements in which cells are transmitted through service-class-specific buffers so that each cell is temporarily stored in the buffer corresponding to the service class of the cell in question. For example, in European Patent Application 596,624 there is a description of such a network in which traffic is classified into different service classes on the basis of the virtual channel identifier VCI. A good service level is provided by such an arrangement in which traffic is divided by fine division into different types, but it makes the node (and the network) complicated at the same time. The arrangement also means that the network cannot make use of the nodes that perform switching only on the virtual path level. (By means of the concept of the virtual path, a large number of connections can be gathered into one bundle which can be handled as one connection. Because of this, it is possible to build into trunk nodes a virtual path network, in which the nodes handle only the virtual path identifier. In this manner, the nodes will be essentially simpler (the processing of the header will become lighter and the switching time shorter). Thus, it is necessary to handle the virtual channel identifier, at the most, in the node nearest to the receiver).

SUMMARY OF THE INVENTION

It is the object of the present invention to eliminate the disadvantages described above and accomplish such a method for prioritizing traffic in the ATM network by means of which the application of the subscriber in question can be taken into account as simply as possible inside the network and with the help of which the service level can nevertheless be maintained good, regardless of changing traffic conditions. This object is accomplished in the method of the invention that is characterized in that the service class division is implemented at least at an NNI interface of the network only by means of virtual path identifiers VPI in the header of the cell so that one service class corresponds to each identifier and a certain group (one or more) of virtual path identifiers belongs to the same service-class. The equipment of the invention in its preferred form, is adapted for carrying out the method.

The idea of the invention is to utilize the concept of the virtual path introduced in the ATM network by classifying the services of the ATM network merely by means of a virtual path identifier. In practice, this means that (a) buffers are arranged service-class-specifically so that a certain group of virtual path identifiers corresponds to each buffer and (b) an individual cell is buffered in the buffer corresponding to the VPI identifier of the cell.

As the trunk node performing switching can thus be maintained as simple as possible, regardless of the service class division, switching will also be fast.

BRIEF DESCRIPTION OF THE DRAWINGS

In the following, the invention and its preferred embodiments are described in more detail with reference to FIGS. 4–6 in the accompanying drawings, in which:

FIG. 5 shows a schematic structure of a trunk or subscriber node of the ATM network and the transmission of cells through the node, and FIG. 6 shows an alternative schematic structure of the subscriber node of the ATM network and the transmission of cells through the node.

DETAILED DESCRIPTION

The ATM network is used by many different applications, the services required by which can differ a great deal from one another. For example, interactive work at a terminal will become difficult if there is a delay of more than 0.5 second in the network, and it will become even more difficult if the delay varies at individual characters. High quality audio and video signals are most sensitive to the variations of delay, but they are not too sensitive to the losses of cells. On the other hand, the delay of the network or its variation has no essential significance for a file transfer traffic, for example, but in relation to this kind of traffic, it is presumed most of all that cell throughput probability is high (loss probability as low as possible).

Figure 4:
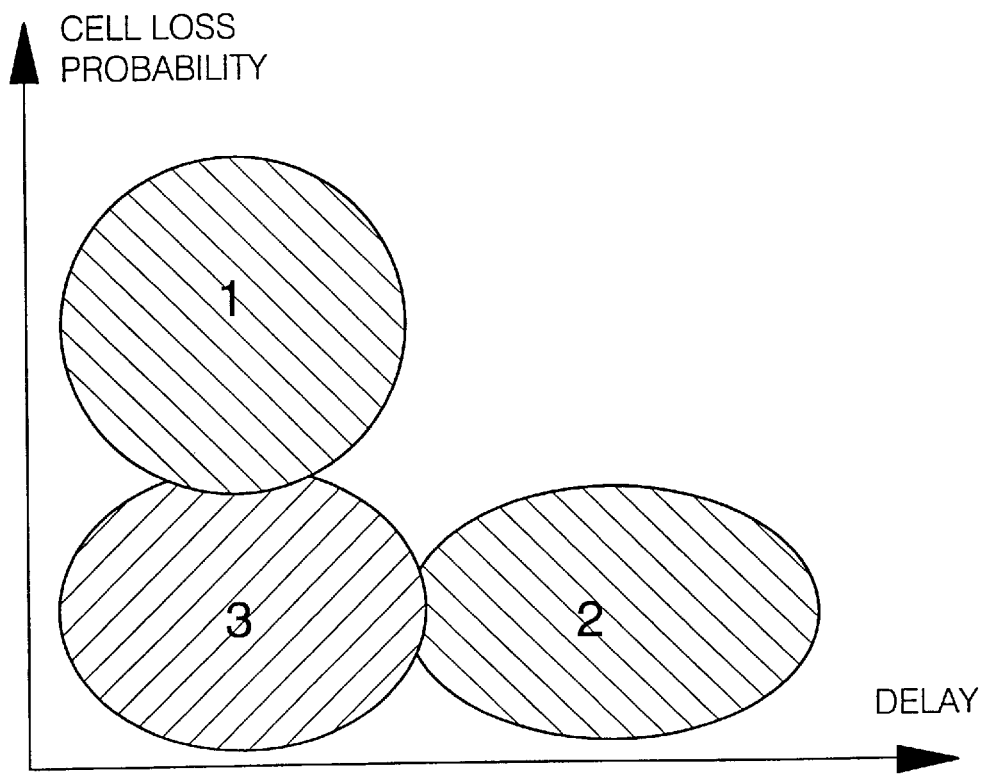
FIG. 4 illustrates a classification of ATM network services according to the invention.

According to the invention, ATM services are described in a delay/loss probability domain as shown in FIG. 4. Area 1 represents a service providing interactivity, Area 2 represents file transfer services and Area 3 represents a service in which both delays and cell throughput probability are optimized. Some real-time image transfer applications, for example, could require this so-called superclass service. With a low traffic rate in the network, the operation takes place near the origin, and the different services do not differ to any greater degree from one another. The network is able to forward all traffic, and no cell losses occur due to congestion. However, momentary network congestion cannot be avoided, and network nodes should respond in such situations as efficiently as possible. When the traffic increases, the operation shifts farther away from the origin, and differences between the services become apparent. Service 2 can utilize a long buffering time to achieve a good multiplexing result. This causes a delay, but it is allowed for this particular service. Service 1 can utilize the fact that delays must not become too long. In this case, the cells can ultimately be discarded, as their transit delay would anyway increase excessively due to congestion. Service 3 aims at both a short delay and a high throughput probability, and so more capacity has to be reserved for it in the nodes.

Cells are transmitted at least in the inner parts of the network, that is, at least at the NNI interfaces via service-class-specific buffers. This way, the network traffic can be prioritized as needed in the delay/loss probability domain. Each class can be provided with the service characteristic to it by class-specific read factors and buffer lengths. At subscriber interfaces, i.e. at UNI interfaces, the traffic transmitted by subscribers is buffered either in the same way as at the NNI interface or alternatively virtual-channel-specifically. The object of virtual-channel-specific buffers of the subscriber interface is to restrict traffic equitably. By buffering cells of each channel in buffers of their own, it is prevented that excess traffic transmitted by some subscribers would impede the access of cells of subscribers transmitting normally to the network. A great number of virtual channels may, however, become a problem for virtual-channel-specific buffering. In the following, both interfaces will be described in more detail.

Service-class-specific buffers based on the virtual path identifier are implemented at the NNI interface of the ATM network. For each service class (1–N) is reserved a buffer of its own, the length of which is determined on the basis of the service class (the buffers of the service classes providing a shorter delay are shorter than the buffers of other service classes). In addition to buffer lengths, the service class also has an effect on the emptying rate of the buffer. All the buffers are emptied as normal by one server but each buffer according to a class-specific read factor. The discarding of cells is performed class-specifically, taking into account just the fill rate of the buffer of the class in question. Threshold values can also be set on the buffers, after which all the cells belonging to the service class in question and having the CLP bit set, are discarded. The number N of classes to be implemented and the properties of the classes can be chosen specifically for each network. However, it is to be noted that as the number of classes increases, the management of buffers becomes more complicated and a corresponding advantage will not be achieved from the method any more. It is recommendable to use the three main classes described above.

Figures 1A, 1B, 1C:
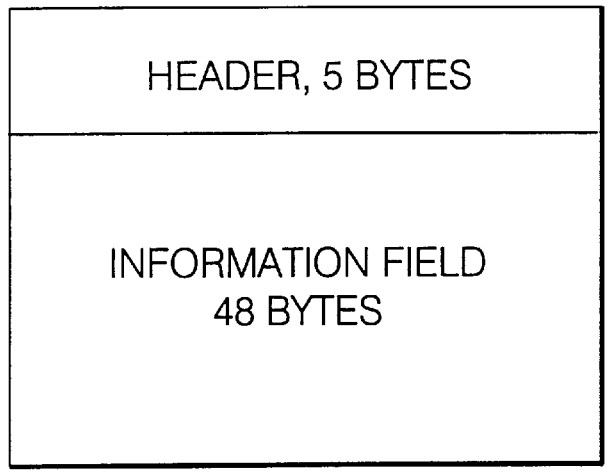
FIG. 1a shows the general structure of an ATM cell.
FIG. 1b shows the structure of the header of the cell at a UNI interface of the network.
FIG. 1c shows the structure of the header of the cell at an NNI interface of the network.
Figure 2:
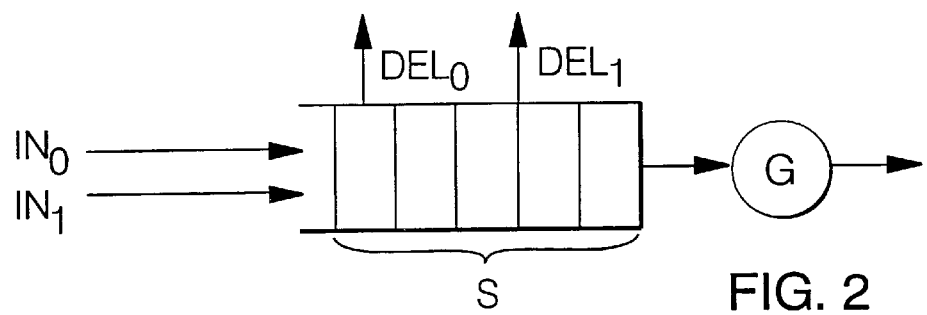
FIG. 2 illustrates one known way of prioritizing cells.
Figure 3:
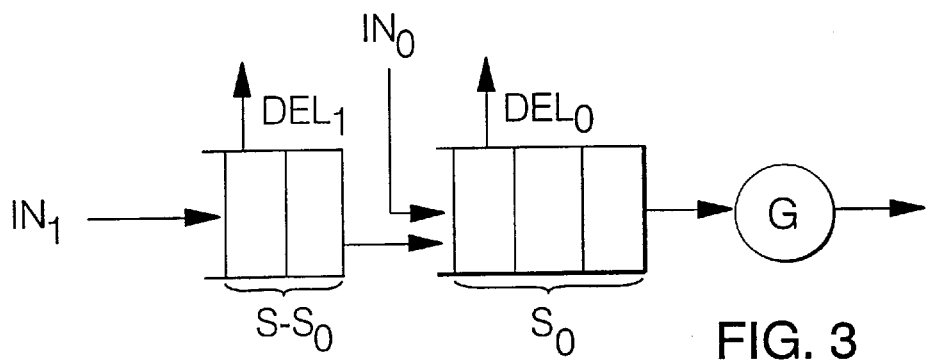
FIG. 3 illustrates another known way of prioritizing cells.

The service class division is carried out with the help of virtual path identifiers VPI (cf. FIGS. 1b and 1c). One service class corresponds to each virtual path identifier VPI. Thus, only traffic of one service class passes on one virtual path. As mentioned above, the use of the mere virtual path identifier in the class division instead of the virtual channel identifier VCI is defended, for example, in that routing at the NNI interface can be carried out to a great degree just on the basis of the virtual path identifiers VPI. The physical connection to which a cell is to be routed is often defined by means of a virtual path. Therefore, physical connections can be divided only by means of the VPI identifier into certain kinds of "paths"; one for each service class instead of a conventional common "path". In theory, this restricts the number of possible different virtual paths. In current systems, however, only part of the bits (12) of the virtual path identifier are in use, so that, in practice, this causes no problems.

FIG. 5 shows an arrangement of the invention in a trunk node of the, network at an NNI interface. The cell as shown in FIG. 1c is received at an ATM node by a special classification unit 53, which reads the virtual path identifier VPI from the header of the cell and selects the service class notified by it (of which classes there are preferably three, as mentioned earlier). Service classes corresponding to different VPI values can be stored in a table T, for example. After having completed the classification by means of the table T, the classification unit 53 applies each cell to an input buffer 54a, 54b or 54c corresponding to the specified service class of the cell. In FIG. 5, the virtual path identifiers indicated by reference signs $VPI_1$, $VPI_2$ and $VPI_3$ are groups of virtual path identifiers corresponding to classes 1, 2 and 3. In this connection, a group refers to one or more VPI values, typically 2 to 3 values. Each inbound (physical) transmission link thus comprises three input buffers, one for each service class. A transmission-link-specific server G1 reads the cells from service-class-specific buffers and forwards them to a centralized router 56 which routes cells further to an interface corresponding to the correct transmission link. At the interface, they are applied, according to the service class selected on the input side of the node, to one service-class-specific output buffer 55a . . . 55c, in which a transmission-link-specific server G2 reads the cells further forwards (out of the node). Each outbound transmission link has three output buffers, one for each service class 1 to 3. Alternatively, classification units may be provided separately for each transmission link even on the output side of the node, in which case classification data need not be transferred within the node.

The reading of buffers with the servers G1 and G2 is carried out in accordance with a service-class-specific parameter, a read factor RD. In practice, the factors determine the proportion of the capacity of the network allocated to the service class in question. The values of the factors could be, for example, as follows:

service class 1: RD=1,
service class 2: RD=1, and
service class 3: RD=3, whereby three cells of service class 3 are read out of the buffers for one cell of service classes 1 and 2. Furthermore, by using class-specific read factors to be adapted in relation to the amounts of traffic specific for a class, the performance of the classes can be ensured. In this case, the method can automatically adapt to changes in the traffic profile within certain limits. Thus, it is made sure, for example, that the cells of a service class with a greater delay, in which the proportion of cells in the total traffic is smaller than assumed, are not served faster than the cells of the so-called superclass (service class 3). Adaptive read factors can in practice be achieved by measuring traffic of each service class for during a certain predetermined period of time and by generating after the period of time new read factors which correspond to the relation of the measured amounts of traffic. This kind of adjustment is preferably continuous.

At subscriber interfaces, that is, at UNI interfaces the prioritization of traffic can possibly be carried out exactly as at NNI interfaces. The example of FIG. 5 can also apply to subscriber nodes in which the input boundary of the node forms a UNI interface. According to a second embodiment of the invention, buffering at the UNI interface can be based on virtual-channel-specific buffers. A buffer is reserved for each virtual channel defined by the VCI value of the routing field in the header of the cell. By buffering cells of each virtual channel in buffers of their own, it is considerably easier to control traffic on the channel than in a situation in which traffic on all channels is buffered in one buffer. At the same time this also prevents the cells of subscribers transmitting excess traffic from impeding the access of cells of other subscribers to the network.

FIG. 6 shows the transmission of cells in a subscriber node in which virtual-channel-specific buffering described above is used at the input boundary. Subscriber interfaces 14a, 14b, etc., are connected first to an identification unit 61 that receives cells that have been formed in an ATM terminal equipment of a subscriber. The identification unit reads a virtual channel identifier VCI from the header of the cell and directs the cell to an output buffer $62_1 \ldots 62_n$ corresponding to the virtual connection notified by the identifier in question. A transmission-link-specific server G3 selects cells from virtual-channel-specific input buffers and forwards them to a centralized router 56 that routes cells further to a classification unit 53 of the correct transmission link (the figure shows only one outbound transmission link). The classification unit 53 reads a virtual path identifier VPI from the header of the cell and selects the service class associated with it in table T. After having completed the classification, the classification unit 53 applies each cell to an output buffer 64a, 64b or 64c corresponding to the specified service class of the cell. Each outbound transmission link thus comprises three input buffers, one for each service class. A server G4 reads the cells from these service-class-specific buffers further to the trunk connection of the network.

The lengths of virtual-channel-specific buffers are determined by both the service class of the virtual channel (services of one class shown above are sold to each virtual channel) and the traffic parameters. Buffering capacity is reserved for each class of cells for a certain period of time, for example, for a traffic of 1 second. Traffic parameters have a direct effect on buffer length; the longer the proportion of traffic bought by the subscriber, the bigger the buffer reserved for the virtual channel. In addition to the buffer length, the service class properties of the virtual channel are ensured by service-class-specific read factors. Each buffer is emptied in the manner described above, according to the read factor, in order to make the prioritization between the classes work in the whole network.

The structure of the input boundary of the subscriber node depends also on what the subscriber interfaces are like. In the above-shown example of the subscriber node, it was assumed that ATM cells were formed and service-class-specific identifiers were written in the ATM terminal equipment of the subscriber. If the subscriber interface is, for example, an FR interface, there is first at the input interface of the subscriber node an FR/ATM converter in which FR frames are segmented into ATM cells and VPI identifiers are written in the headers of the cells in accordance with the service class of the cell.

Although the invention is above explained with reference to the examples of the accompanying drawings, it is clear that the invention is in no way restricted thereto, but it can be modified within the scope of the inventive idea disclosed above and defined in the appended claims. For example, the more exact inner structure of the nodes can vary in many ways even if the service classes and the buffers corresponding to them are implemented in compliance with the idea of the invention. In principle, one service class can physically have more than one buffer (even if one buffer is the most preferred alternative because of its simple implementation).

A list of references

[1]. Recommendation I.361: B-ISDN ATM Layer Specification, CCITT; ANSI T1.617 Annex D.

[2]. Recommendation I.610: B-ISDN operation and maintenance principles and functions, CCITT Study Group XVIII Geneva, 9–19 Jun. 1992.

We claim:

1. A method for prioritizing traffic in an ATM network, comprising the steps of:

dividing services of the network into a plurality of different service classes;

transmitting cells via a plurality of service-class-specific buffers, such that each cell is temporarily stored in the service-class-specific buffer corresponding to the service class of the respective said cell; and implementing said dividing at a network to network interface of the network by including a respective one of a plurality of identifiers, of a network to network virtual path located only in the header of each said cell, so that one service class corresponds to only one said network to network virtual path identifier and a respective certain group of said network to network virtual path identifiers belongs to a respective same service class.

2. A method according to claim 1, wherein: in said dividing step, the services of the network are divided into three service classes including:

a first service class, to which a certain first group of virtual path identifiers corresponds, for providing an interactive service in which delays are kept short, a second service class, to which a certain second group of virtual path identifiers corresponds, for providing a low cell loss probability while delays are less critical; and a third service class, to which a certain third group of virtual path identifiers corresponds, for providing both a short delay and a low cell loss probability.

3. A method according to claim 1, further comprising:

also transmitting said cells via service-class-specific buffers a user-to-network interface of the network.

4. A method according to claim 1, further including the steps of:

reading cells out of said service-class-specific buffers by using service-class-specific read factors, measuring the amount of traffic for each service class during a certain period of time, and changing the mutual relationship between the read factors in the service classes to correspond to the mutual relationship between the amounts of traffic measured in said measuring step.

5. An equipment for prioritizing traffic in a node of an ATM network, which equipment comprises:

classification means for distributing the incoming cells into a plurality of different service classes on the basis of a network to network virtual path identifier in header of each said cell, a plurality of buffers, including a buffer for each service class of said plurality of service classes, at a network to network interface of said network, arranged for storing each incoming cell in the buffer corresponding to the service class of the cell, and storing means arranged for storing said service classes corresponding to network to network virtual paths so that each said service class corresponds to a respective one network to network virtual path identifier, said classification means being arranged to classify said cells on the basis of information received from said storing means.

6. An equipment according to claim 5, further comprising:

a respective buffer arranged for each said service class at a user to network interface of the network.

7. An equipment according to claim 5, wherein said classification means is adapted to distribute the incoming cells into three service classes so that the first service class, to which a certain first group of virtual path identifiers corresponds, provides an interactive service in which delays are kept short, the second service class, to which a certain second group of virtual path identifiers corresponds, provides a low cell loss probability while delays are less critical; and the third service class, to which a certain third group of virtual path identifiers corresponds, provides both a short delay and a low cell loss probability.

* * * * *